(12) United States Patent
Kuiper et al.

(10) Patent No.: US 10,288,643 B2
(45) Date of Patent: May 14, 2019

(54) SCANNING PROBE MICROSCOPY SYSTEM FOR MAPPING HIGH ASPECT RATIO NANOSTRUCTURES ON A SURFACE OF A SAMPLE (71) Applicant: Nederlandse Organisatie voor toegepast-natuurwetenschappelijk onderzoek TNO, 's-Gravenhage (NL)

(72) Inventors: Stefan Kuiper, 's-Gravenhage (NL); William Edward Crowcombe, 's-Gravenhage (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 0 days.

(21) Appl. No.: 15/744,160

(22) PCT Filed: Jul. 14, 2016

(86) PCT No.: PCT/NL2016/050521
§ 371 (c)(1),
(2) Date: Jan. 12, 2018

(87) PCT Pub. No.: WO2017/010882
PCT Pub. Date: Jan. 19, 2017

(65) Prior Publication Data
US 2018/0210008 A1 Jul. 26, 2018

(30) Foreign Application Priority Data
Jul. 15, 2015 (EP) .................................... 15176830

(51) Int. Cl.
*G01Q 70/02* (2010.01)
*G01Q 20/00* (2010.01)

(52) U.S. Cl.
CPC ............. *G01Q 70/02* (2013.01); *G01Q 20/00* (2013.01)

(58) Field of Classification Search
None
See application file for complete search history.

(56) References Cited

U.S. PATENT DOCUMENTS 5,376,790 A * 12/1994 Linker ................... G01Q 10/04
250/307
5,448,399 A * 9/1995 Park ....................... G01Q 20/02
359/227

(Continued)

FOREIGN PATENT DOCUMENTS

WO 2008053217 A1 5/2008
WO 2013050770 A1 4/2013

*Primary Examiner* — Michael J Logie
(74) *Attorney, Agent, or Firm* — Hoffmann & Baron, LLP (57) ABSTRACT

A scanning probe microscopy system for mapping nanostructures on a surface of a sample is described. The nanostructures include at least one face having a slope with a slope angle that exceeds a threshold. The system includes a metrology frame, a sample support structure, a sensor head including a probe which includes a cantilever and a probe tip, and an actuator for scanning the probe tip relative to the substrate surface. For sensing the nanostructures, the probe tip is arranged under a fixed offset angle with respect to the sensor head such as to be angled relative to the sample surface. The system further includes a sensor head carrier for receiving the sensor head, the sensor head carrier and the sensor head being provided with a mutually cooperating mounting structure for forming a kinematic mount having at least three contact points for detachable mounting of the sensor head on the sensor head carrier.

16 Claims, 6 Drawing Sheets

(56) References Cited

U.S. PATENT DOCUMENTS

| | | | | |
|---|---|---|---|---|
| 5,672,816 A | * | 9/1997 | Park | G01Q 10/02 |
| | | | | 359/391 |
| 5,854,487 A | * | 12/1998 | Braunstein | G01Q 10/04 |
| | | | | 850/9 |
| 5,861,624 A | * | 1/1999 | Alexander | B82Y 35/00 |
| | | | | 850/26 |
| 8,099,793 B2 | * | 1/2012 | Jo | G01Q 70/02 |
| | | | | 850/40 |
| 8,884,222 B2 | * | 11/2014 | Rychen | G01Q 70/02 |
| | | | | 250/306 |
| 2004/0140426 A1 | * | 7/2004 | Kwon | B82Y 35/00 |
| | | | | 250/234 |
| 2010/0170015 A1 | * | 7/2010 | Park | B82Y 35/00 |
| | | | | 850/1 |
| 2010/0218285 A1 | * | 8/2010 | Park | B82Y 35/00 |
| | | | | 850/1 |
| 2012/0324608 A1 | * | 12/2012 | Rychen | B82Y 35/00 |
| | | | | 850/53 |

\* cited by examiner

SCANNING PROBE MICROSCOPY SYSTEM FOR MAPPING HIGH ASPECT RATIO NANOSTRUCTURES ON A SURFACE OF A SAMPLE

This application is the U.S. National Phase of, and Applicants claim priority from, International Patent Application Number PCT/NL2016/050521 filed 14 Jul. 2016, which claims priority from EP 15176830.6 filed 15 Jul. 2015, each of which is incorporated herein by reference.

FIELD OF THE INVENTION

The present invention is directed at a scanning probe microscopy system for mapping nanostructures on a surface of a sample, the system being arranged for sensing a high aspect ratio nanostructure, the high aspect ratio nanostructure comprising at least one face having a slope with a slope angle relative to the surface of the sample that exceeds a predetermined threshold angle, the system comprising a metrology frame, a sample support structure for supporting a sample, a sensor head including a probe, wherein the probe comprises a cantilever and a probe tip, and wherein the scanning probe microscopy system further comprises an actuator for scanning the probe tip relative to the substrate surface for mapping of the nanostructures.

BACKGROUND

Within the field scanning probe microscopy (SPM), such as atomic force microscopy (AFM), particular attention is paid to proper sensing and mapping of high aspect ratio features. High aspect ratio structures are structures on the surface of the substrate that comprise one or more sidewalls having an angle (relative to the normal on the surface) that is smaller than half the cone angle of the probe tip for e.g. a symmetric cone shaped or triangular prism shaped tip. For these high aspect ratio structures, the sidewalls are thus steeper than the angle of the probe tip. Therefore, the angle of the probe tip in these cases prevent accurate determination of the shape of the high aspect structure.

Figure 1A:
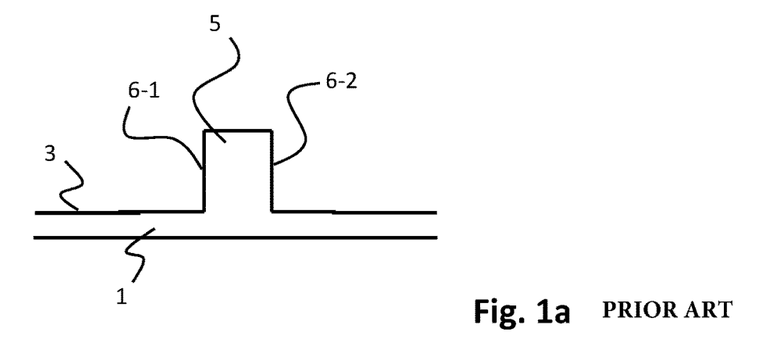
FIGS. 1A to 1C provide exemplary illustrations of inaccuracy caused by the scanning of high aspect ratio nanostructures in SPM.
Figure 1B:
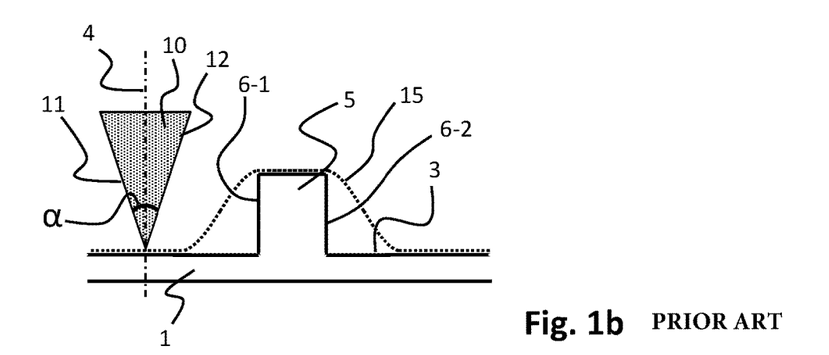
Figure 1C:
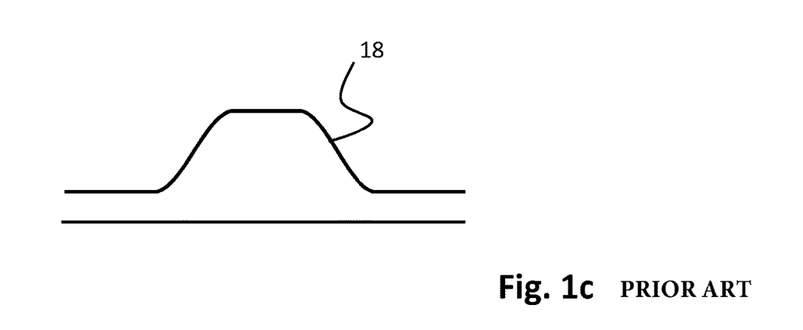

The problem is exemplarily illustrated in FIG. 1A to 1C. In FIG. 1A, a substrate 1 comprises a substrate surface 3 that is to be scanned using a scanning probe microscopy device in order to map the structures present on the surface 3. The surface 3 comprises a nanostructure 5. Nanostructure 5 comprises side walls 6-1 and 6-2 forming straight angles with the plane of the surface 3, i.e. being parallel to the normal through the surface 3. Thus, the angle between the surface 3 and any of the walls 6-1 or 6-2 is approximately $\pi/2$ radians. The angle between any of walls 6-1 and 6-2 and the normal to the surface is 0 radians.

In FIG. 1B, a probe tip 10 of the scanning probe device is schematically illustrated in cross section. The probe tip 10 is cone shaped, and the angle $\alpha$ is the angle between the opposing sides 11 and 12 of the probe tip which defines the sharpness of the cone. The axis 4 defines the axis of symmetry of the probe tip 10. If the surface would be flat or if it would only comprise shallow structures with gradual edges or side faces, there would be no trouble for the probe tip 10 to follow the surface perfectly accurate. In the situation of FIGS. 1A to 1C, the nanostructure 5 is a high aspect ratio nanostructure having very steep walls 6-1 and 6-2 relative to the surface 3. Defined differently, the angle between the normal through the surface 3 and any of the walls 6-1 or 6-2 of the nanostructure 5 is smaller than half of the angle $\alpha$ of the probe tip. In this situation, during scanning of the probe tip 10 across the surface 3, the probe tip follows the scan path 15. This scan path 15 is smoothed at an exaggerated amount upon encountering the walls 6-1 and 6-2. This is because the angled sides 11 and 12 experience van der Waals forces at the edges of the walls 6-1 and 6-2 of nanostructure 5. Smoothening is due to limited tip sharpness, and limited tip-sample control bandwidth.

The result of scanning of the high aspect ratio nanostructure 5 is illustrated in FIG. 1C which shows the resulting sensor signal 18 from the scan of nanostructure 5. The scanning probe microscopy device is not able to accurate map the walls 6-1 and 6-2 and the edges of the nanostructure 5.

Figure 2A:
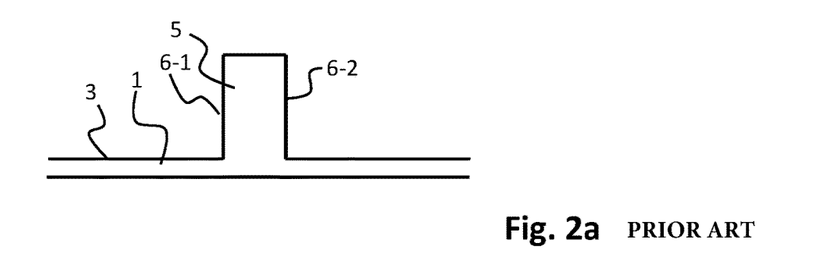
FIGS. 2A to 2D schematically illustrate how high aspect ratio nanostructures may be mapped using a tilted probe.
Figure 2B:
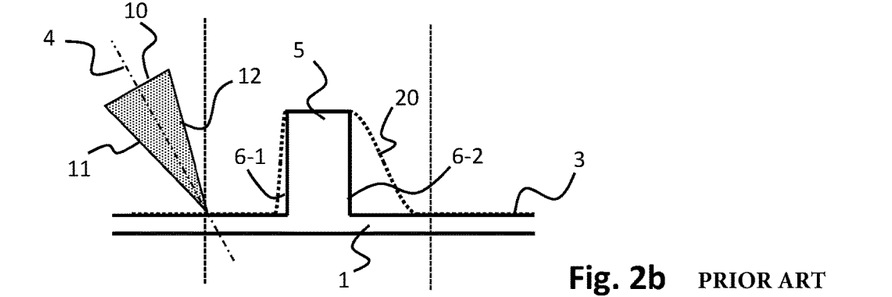
Figure 2C:
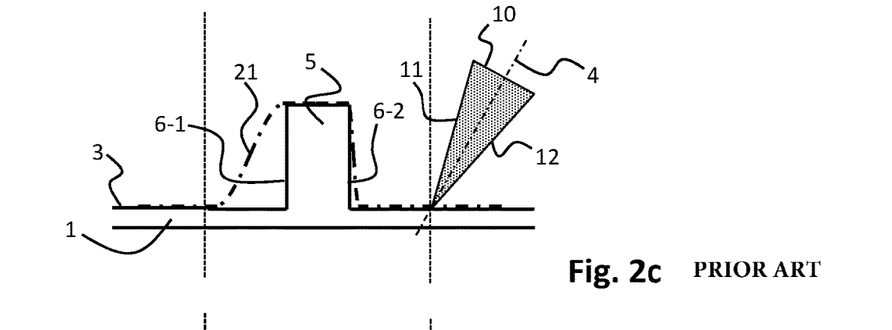

A known solution to overcome the above problem is illustrated in FIGS. 2A to 2C. FIG. 2A again shows the nanostructure 5 on the surface 3 of the substrate 1, having high aspect ratio side walls 6-1 and 6-2. To measure and map the walls 6-1 and 6-2 more accurately, scanning is now performed in two directions with a tilted probe tip 10, as illustrated in FIGS. 2B and 2C. In FIG. 2B, the probe tip 10 is tilted with it's symmetry axis backward with respect to the scanning direction (which is in FIG. 2B from left to right). Due to the tilting, side 12 of probe tip 10 no longer limits the accuracy of the measurement upon encountering the wall 6-1. However, this gained accuracy for wall 6-1 comes at the cost of accuracy for sensing wall 6-2, because going from left to right with probe tip 10, the side 11 of the probe tip will limit accuracy of mapping even more at wall 6-2. This therefore results in scan path 20.

Figure 2D:
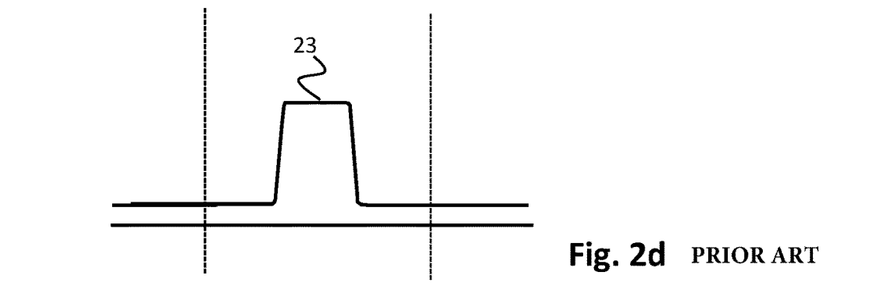

To resolve the inaccuracy at wall 6-2, the same scan is performed in the reverse direction by moving the probe tip 10 from right to left. This is illustrated in FIG. 2C. During scanning in the other direction, also the tilting of the probe tip is reversed. Probe tip 10 now follows scan path 21, which accurately maps wall 6-2 at the cost of accuracy at wall 6-1. The both paths 20 and 21 are combined, and the resulting sensor signal 23 providing the mapping of nanostructure 5 is illustrated in FIG. 2D. As can be seen, the walls 6-1 and 6-2 have been mapped at a much better accuracy as compared to the mapping result illustrated in FIG. 1C.

Although the above method works well for obtaining an accurate mapping of the structures, the measuring method has several drawbacks. For example, the probe must be tilted and the tilt angle of the probe relative to the normal through the surface 3 must be exactly the same but mirrored in the respective scanning directions. The accuracy of the tilting is difficult to achieve. Moreover, the tilting requires a hinge structure and an additional tilting actuator in the metrology loop of the system. These elements introduce additional inaccuracy by comprising parts that are differently sensitive to temperature variations, and by having increased sensitivity to external vibrations. Moreover, to prevent crashing of the probe into the sample surface, dedicated SPM probes are required being suitably shaped.

SUMMARY OF THE INVENTION

It is an object of the present invention to resolve the disadvantages of the prior art scanning probe microscopy solutions, and to provide a system that allows mapping high aspect ratio nanostructures on a surface of a sample with high accuracy in a convenient manner.

To this end, there is provided herewith a scanning probe microscopy system for mapping nanostructures on a surface of a sample, said nanostructures including nanostructures comprising at least one face having a slope with a slope angle relative to a normal to the surface of the sample, wherein the slope angle is smaller than a threshold angle, the system comprising a metrology frame, a sample support structure for supporting a sample, a sensor head including a probe, wherein the probe comprises a cantilever and a probe tip, and wherein the scanning probe microscopy system further comprises an actuator for scanning the probe tip relative to the substrate surface for mapping of the nanostructures, wherein, for sensing the nanostructures, the probe tip is arranged under a fixed offset angle with respect to the sensor head such as to be angled relative to the sample surface, and wherein the system further comprises a sensor head carrier for receiving the sensor head, the sensor head carrier and the sensor head being provided with a mutually cooperating mounting structure having at least three contact points for detachable mounting of the sensor head on the sensor head carrier.

In accordance with the present invention, the probe tip is arranged under a fixed offset angle with respect to the sensor head such as to be angled relative to the sample surface. Thus, the tilting of the probe tip relative to the substrate surface is fixed for the respective sensor head and probe. Because the probe tip is already tilted with respect to the substrate surface, no further tilting such as to measure the high aspect ratio nanostructures is required. As a result, the scanning probe microscopy system of the present invention does not require any elements or a hinge structure that allow to perform the tilting. As a result, the sources of inaccuracy and thermal instability are no longer present in the scanning probe microscopy system of the present invention, while the arrangement of the invention still allows the mapping of high aspect ratio nanostructures on the surface.

In addition to the above, the scanning probe microscopy system of the present invention includes a sensor head carrier that is arranged for receiving the sensor head. The sensor head carrier and the sensor head are both equipped with mutually cooperating mounting structures and elements having at least three contact points for detachable marking of the sensor head on the sensor head carrier. Thus the sensor head can be detached from the sensor head carrier. Preferably, in accordance with embodiments, the mutually cooperating mounting structure forms a kinematic type mount. Placing the sensor head back on the sensor head carrier can be performed very accurately with high reproducibility using such a kinematic mount. As a result, the sensor head can be detached from the sensor head carrier, and placed back onto the sensor head carrier after being rotated n radians around its measurement axis transfers to the substrate surface. Thus the sensor head of the system can be picked up, rotated for n radians, and placed back onto the sensor head carrier. Using the kinematic mount, this can be done repeatedly while preserving the accurate orientation of the sensor head with respect to the surface and scan path in both positions.

An additional advantage is that in either direction back and forth along the scan lines, the same side of the probe tip is used for scanning across the surface. In the conventional systems that rely on tilting, a different side of the probe tip is used for scanning in either direction. This causes a further inaccuracy with respect to position determination of the probe tip on the surface. Differences may be present between different sides of the tip, i.e. tip asymmetry. Where the same side of the probe tip can be used in either direction, as is the case with the present invention, this inaccuracy is not present.

In view of the above, the invention is thus based on implementing a fixed offset angle of the probe tip relative to the substrate surface for enabling accurate determination of the high aspect ratio nanostructures on the surface, in combination with using a separable sensor head and sensor head carrier being equipped with mutually cooperating mounting structures that form a kinematic mount. Tilting of the probe tip is therefore no longer required, and the sensor head can simply be rotated around an axis perpendicular to the substrate surface. With respect to the fixed offset angle of the probe tip relative to the surface, it is to be said that any offset angle may be applied, depending on the desired accuracy of mapping the high aspect ratio nanostructures. For structures extending from the surface perpendicular therefrom (i.e. making a straight angle with the surface), the slope angle of the side walls relative to the normal through the surface is 0 radians. To allow accurate sensing of the slope of the side wall, the tilting backwards of the probe tip may for example be at least half of the tip's cone angle (e.g. the angle $\alpha$ in FIG. 1B) of the probe tip such as to provide high accurate measuring of such high aspect ratio walls in the forward direction of the scanning. As may be appreciated, the minimum required tilting angle (here: half of the cone angle of the tip) is dependent on the angle between the high aspect ratio wall and the normal to the surface of the substrate. For high aspect ratio walls that have a less than straight angle with the surface of the substrate, e.g. where the slope angle relative to the normal is 0 radians $\leq \beta \leq \alpha/2$ (where $\beta$ is the slope angle and a is the cone angle), the tilting of the probe tip may be at least ($\alpha/2-\beta$) to provide a same accuracy. For high aspect ratio walls that extend from the substrate surface at an angle that is even larger than straight (e.g. $>\pi/2$ radiance), the slope angle relative to the normal becomes negative, i.e. $\beta<0$ radians. Hence, to accurately sense the slope of the side walls, the tilting backwards of the probe tip is to be increased become at least ($\alpha/2-\beta$) to obtain a same accuracy. Thus, the tilting angle of the probe tip can be dependent on the type of sample to be scanned.

In accordance with some embodiments of the invention, the mutually cooperating mounting structure on the sensor head and the sensor head carrier comprises at least three slots and at least three structural elements cooperating with the slots, wherein each of the slots arranged on either one of the sensor head or the sensor head carrier cooperates with at least one of the structural elements arranged on an other one of the sensor head carrier and the sensor head.

A kinematic mount comprising cooperating structures on the sensor head carrier and the sensor head, may well be formed in accordance with this embodiment by using mutually cooperating slots and structural elements. Although in the present documents examples will be described and wherein the structural elements are present on the sensor heads and the slots are present on the sensor head carrier, the invention can also be implemented by providing the sensor head carrier with the structural elements and providing the slots therefore on the sensor head. These structural elements may for example be formed of ball or ball type feet. The slots may be of any suitable shape, such as trenches with angles walls or rectangulars. Various designs for kinematic mounts may be apparent to the skilled person.

Yet, in accordance with some further embodiments, a number of slots of the mounting structure is larger than a number of structural elements, for allowing the sensor head to be mounted on the sensor head carrier in a plurality of selectable orientations with respect thereto.

Where the number of slots of the mounting structure is larger than the number of structural elements, the number of slots can be placed in such a manner that the sensor head can be placed onto the sensor head carrier having more than two different orientations. Hereinafter, examples will be described that allow for example six different orientations, and even an example which allows twelve different orientations. In principle, any desired number of slots that is suitably placed with respect to the structural elements forming the kinematic mounts can be applied for providing any number of orientations of the sensor head relative to the sensor head carrier.

Alternatively, in embodiments wherein the mutually cooperating mounting structure is not necessarily a kinematic type mount, the mutually cooperating mounting structure may comprise cooperating coupling members arranged for allowing the sensor head to be mounted on the sensor head carrier in an arbitrary orientation with respect thereto, such as including cooperating circular shaped coupling members. This would allows any arbitrary scan direction of the scan head relative to the substrate. For example, an embodiment may be foreseen wherein the scan head may have feet with a relatively large radius and no slots are present on the sensor head carrier. The feet may be preloaded with magnets. Separate guiding pins may be used to determine the head orientation. As will be appreciated, alternatively, vice versa the feet may be present on the sensor head carrier with no slots present on the scan head.

Moreover, in accordance with other embodiments, the scanning probe microscopy system further comprises a positioning actuator arranged for cooperating with the sensor head, wherein the positioning actuator is arranged for lifting the sensor head from the sensor head carrier, and for rotating the sensor head relative to the sensor head carrier such as to align the sensor head with at least one of said selectable orientations. In these embodiments of the invention, the positioning actuator that allows to lift the sensor head from the sensor head carrier and change its orientation or rotation relative thereto enables to quickly change the direction of scanning in operation of the system. After placing the sensor head back into the kinematic mount on the sensor head carrier, the scanning can be continued in a new direction with the same accuracy as in the previous direction. Optionally, the positioner may be further arranged for moving the substrate as well.

In accordance with some further embodiments, the system further comprises one or more position sensors for monitoring a position, relative to the metrology frame, of at least one of: the sensor head carrier, the sensor head, the probe, the sample carrier, the sample or the surface of the sample. Accuracy of the system is importantly improved by using position sensors that monitor the relative position of these elements relative to the metrology frame. Any vibration or disturbance that causes an offset (in view of the nanometer accuracy of the system) can be monitored through the position sensors. In particular in some of these embodiments, the one or more position sensors are mounted on the metrology frame. In principle, a single position sensor may be used, but the accuracy may be improved by using multiple position sensors. The position sensors may include any suitable type of sensors, such as interferometers, capacitive sensors, inductive sensors, encoder type sensors (e.g. reading encoder markings) or other types of proximity or distance sensors.

In accordance with some further embodiments, the system further includes a force frame separate from the metrology frame such as to be mechanically decoupled therefrom, the system further including an XYZ-positioner actuator mounted on the force frame, wherein the XYZ-positioner actuator supports either one of: the sensor head carrier; or a sample carrier for supporting the sample; said either one of the sensor head carrier or sample carrier being mounted on the XYZ-positioner actuator for enabling relative movement between the sensor head carrier and the sample carrier.

The use of a force frame in addition to the metrology frame in these embodiments allows to implement the XYZ-positioner, thereby keeping this element out of the metrology frame. For example, the force frame may serve as a heat sink that allows to keep the sensor head and the sensor head carrier at a stable temperature. Importantly, mechanical reaction forces induced by the XYZ-positioner responsive to movement are transferred to the force frame instead of the metrology frame, increasing accuracy of the measurements. Moreover, dampers can be applied between the metrology frame and a force frame for suitably damping any mechanical vibrations to prevent these from disturbing the mapping process.

The XYZ-positioner allows moving of the sensor head or the sample carrier relative to the metrology frame, and enables relative motion between the sensor head and the substrate surface. For example, in some of the embodiments the XYZ-positioning actuator comprises a Steward platform, the Steward platform comprising at least six slider legs including prismatic joints such as to form a hexapod positioner for positioning the sensor head carrier. The XYZ-positioner actuator mounted on the force frame allows to accurately maintain the position of the sensor head carrier or the sample carrier relative to the metrology frame. Preferably, a hexapod design or Steward platform may be applied. The hexapod design allows to suitably control the motion of the sensor head carrier relative to the metrology frame in all directions of translation, and in all directions of rotation. This can be done in an accurate manner. The interferometers monitoring the position of the sensor head carrier may be used as input to control the position of the sensor head carrier by means of the XYZ-positioner actuator. Also, additional or alternative position sensors may be applied to monitor the location of the XYZ-positioner actuator.

In an embodiment comprising a force frame, a metro frame, a hexapod and interferometers, a specific implementation of dampers may be implemented in the system to remove vibrations as a source of inaccuracy of the system. For example, the force frame may be placed directly on the floor with no dampers at all, and weak dampers having a low resonance frequency may be in between the force frame and the metro frame. In this configuration the hexapod may follow any movement of the metro frame relatively to the force frame. In an even more accurate setup, the force frame is itself weakly damps using dampers having a resonance frequency of one hertz thereby damping in the range above 1 hertz. In between the force frame and the metrology frame dampers may be stalled that will start damping in the range from 10 hertz and higher. The hexapod itself may for example have a resonance frequency of 6 hertz, thereby any vibrations higher than 6 hertz will not influence the hexapod. The hexapod will follow the movement of the metrology frame actively via the feedback control over the interferometers. Key is that due to the dampers the metrology frame is hardly moving. Due to the fact that the hexapod is also softly suspended with respect to the force frame the scan-head is also hardly affected by any ground vibrations.

Moreover, the scanning probe microscopy system of the invention, in accordance with some embodiments, includes one or more further sensor heads, each further sensor head comprising a probe including a cantilever and a probe tip, wherein for each further sensor head the cantilever of the probe extends from a mounting face of the sensor head under a fixed offset angle therewith such as to be angled relative to the sample surface, the fixed offset angle being unique to said respective further sensor head. In this embodiment, a plurality of sensor heads with probes having different fixed offset angles may be available in the system that can be easily replaced dependent on the high aspect ratio nanostructures to be scanned. Alternatively, it may be also possible to change the probe-angle in the scan-head, as long as this angle is stable during the measurement.

In the scanning probe microscopy system in accordance with some embodiments, the probe tip comprises a cone angle defined by an internal angle between opposing sides of the probe tip, and the abovementioned threshold angle is equal to half of the cone angle. Moreover, for some embodiments as explained, the fixed offset angle of the probe tip is at least half of the cone angle minus an expected maximum slope angle of the nanostructures relative to a normal to the surface of the substrate. Moreover, for some embodiments, said nanostructures comprise side walls perpendicular to the surface, and the fixed offset angle is half of the cone angle.

In accordance with some embodiments, the mutually cooperating mounting structure of the scanning probe microscopy system further comprises one or more magnets for allowing static detachable fixing of the sensor head to the sensor head carrier, said magnets including at least one of: one or more electromagnets, or one or more permanent magnets. As may be appreciated, electromagnets provide the advantage of locking and unlocking the scan head to the sensor head carrier by controlling the magnets.

BRIEF DESCRIPTION OF THE DRAWINGS

The invention will further be elucidated by description of some specific embodiments thereof, making reference to the attached drawings. The detailed description provides examples of possible implementations of the invention, but is not to be regarded as describing the only embodiments falling under the scope. The scope of the invention is defined in the claims, and the description is to be regarded as illustrative without being restrictive on the invention. In the drawings:

DETAILED DESCRIPTION

Figure 3:
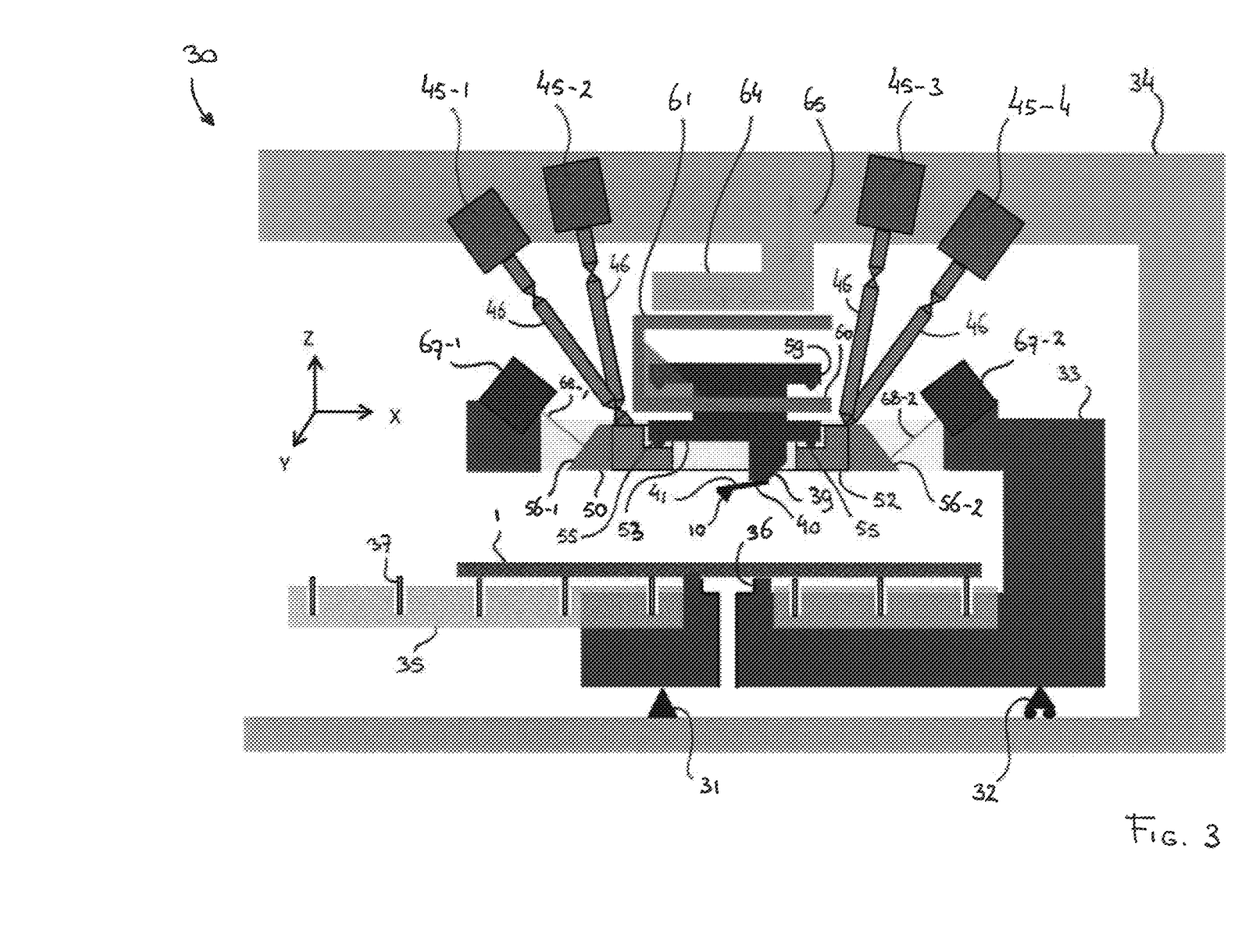
FIG. 3 illustrates a scanning probe microscopy system in accordance with the present invention.

FIG. 3 schematically illustrates a scanning probe microscopy system 30 in accordance with the present invention. The system comprises a force frame 34 that supports a metrology frame 33. The metrology frame 33 is placed on the force frame 34 using dampers 31 and 32. The metrology frame 33 comprises a substrate carrier 35 for supporting a substrate 1 to be scanned with the scanning probe microscopy system. The substrate carrier for example comprises a sample suction clamp 36 that clamps a sample underneath the measurement area. In addition, a plurality of burls 37 may be present on the substrate carrier 35 to support the substrate in other areas. The illustrated design of the substrate carrier is merely an example, and other designs of a substrate table may be applied, for example a table that supports the sample across its full surface or a clamping arrangement that clamps the sample in a different manner.

The sample 1 comprises a plurality of nanostructures that are to be mapped by the scanning probe microscopy system 30. To this end, the scanning probe microscopy system 30 comprises a sensor head 39 that includes a probe 40. The probe 40 comprises a cantilever 41 and a probe tip 10. The cantilever is placed under a fixed offset angle relative to the sensor head 39, such as to fix the offset angle of probe tip 10 relative to the substrate surface of substrate 1. During mapping of the nanostructures, the probe tip 10 will be scanned across the surface of the substrate. Usually, the sensor head will be lowered towards the surface of the sample 1 (or the sample 1 will be lifted towards the probe tip 10). The probe 40 is brought in vibration, and the exact position and amplitude of the probe tip 10 is monitored using an interferometer. If the probe tip encounters a surface structure, the amplitude of the vibration will change, allowing the mapping of the surface structures.

The sensor head 39 extends from a mounting structure 53. The mounting structure 53 is placed on a cooperating structure of a sensor head carrier 50 of the system. As can be seen from FIG. 3, the mounting structure 53 of the sensor head comprises a plurality of ball feet 55. These ball feet 55 cooperate with correspondingly formed slots on the inner ring 52 of the sensor head carrier 50, as will be explained in more detail hereinbelow.

The sensor head 39 further comprises an upper part 59 in addition to the mounting structure 53. The upper structure 59 allows lifting of the sensor head from the sensor head carrier. In the embodiment illustrated in FIG. 3, a lifting arrangement consisting of a lifting actuator 65, a rotational actuator 64 and a gripper 61 allow lifting of the sensor head. In case the gripper 61 is lifted using the actuator 65, the feet on the upper part 59 of the sensor head will engage on the gripper 61, thereby lifting the sensor head from the sensor head carrier. In another embodiment, the upper part 59 and the mounting structure 53 may be movable relative to each other such as to move the upper part towards the lower mounting structure 53. By moving the upper part 59 to the lower mounting structure 53 at some point the feet of the upper part engage on the gripper 61, thereby automatically releasing the ball feet 55 from the slots of the kinematic mount.

The sensor head carrier 50 suspends from the force frame by means of a plurality of actuators 45-1, 45-2, 45-3 and 45-4 that form a hexapod type of positioning actuator (Steward platform). The legs 46 can each be increased or decreased in length, and can be rotated using actuators 45-1, 45-2, 45-3 and 45-4. These movements are performed in a coordinated manner such as to very accurately position the sensor head carrier 50 relative to the metro frame 33. The exact location or position of the sensor head carrier relative to a metro frame can be monitored using interferometers 67-1 and 67-2. The hexapod design structure may be used to perform all kinds of directions of the sensor carrier relative to the metro frame. Moreover, the hexapod design can be used to perform the scanning motion of the sensor head relative to the substrate surface during mapping of the nanostructures. Interferometer 67-1 thereby projects a laser beam 68-1 onto a first side 56-1 of the sensor head carrier.

Interferometer 67-2 likewise projects a laser beam 68-2 onto the side 56-2 of the sensor head carrier.

Figure 4A:
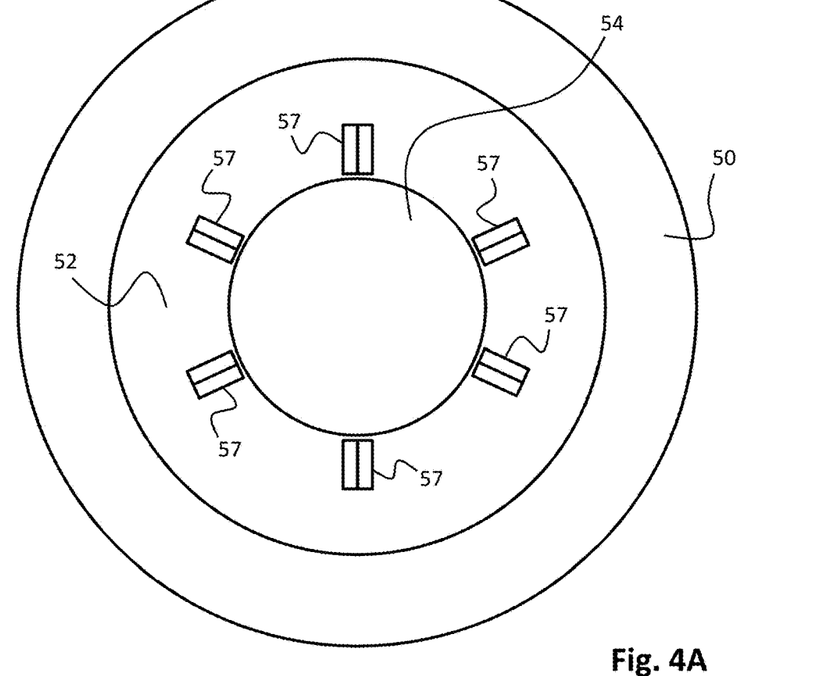
FIGS. 4A and 4B provides schematic illustrations of the kinematic mount formed by slots and structural elements on the sensor head and the sensor head carrier.
Figure 4B:
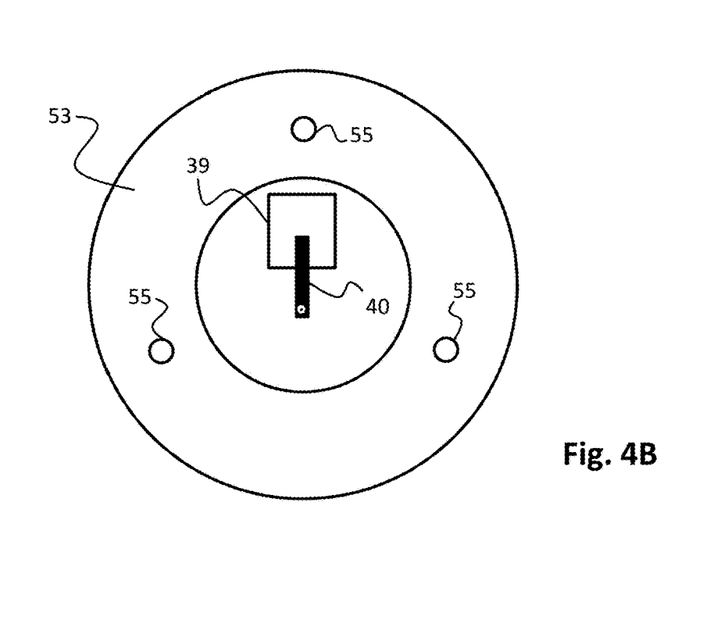
Figure 5A:
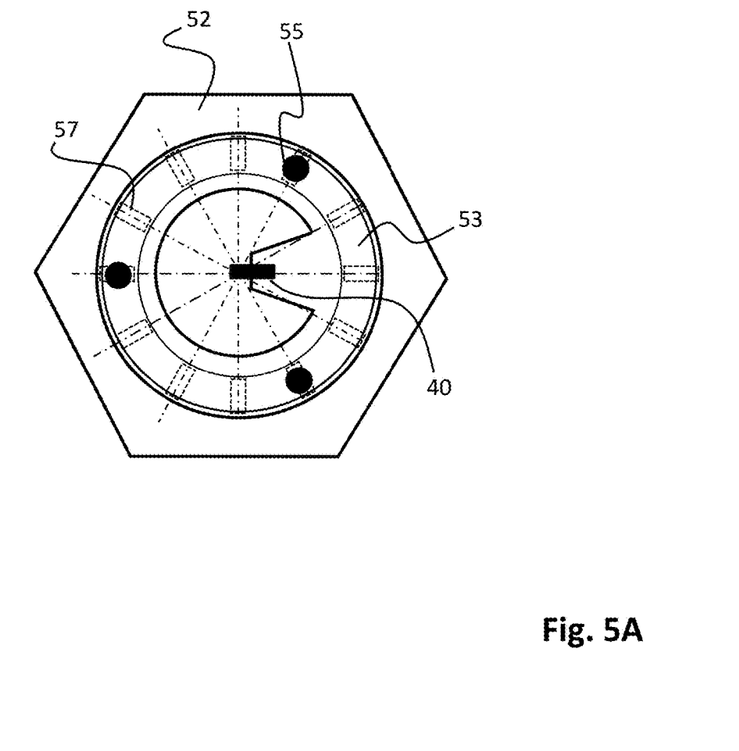
FIGS. 5A and 5B illustrate further exemplary arrangements between the sensor head carrier and the sensor head in the system of FIG. 3.
Figure 5B:
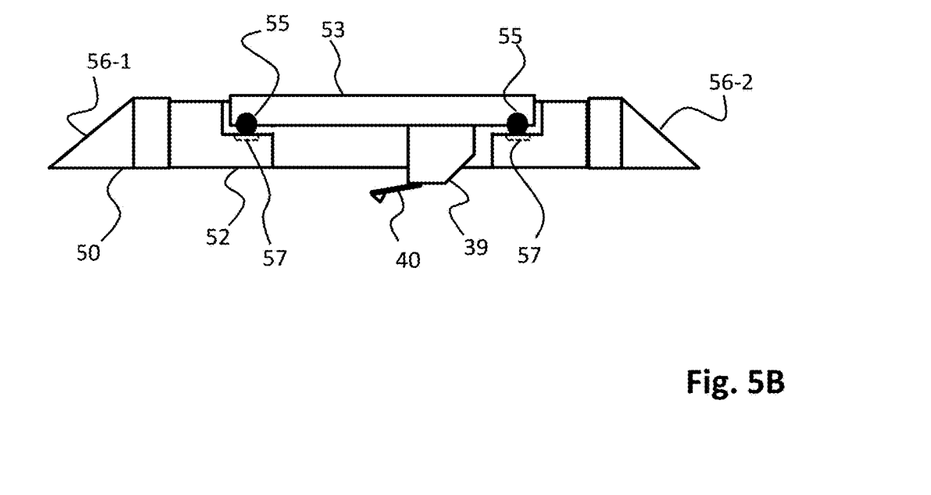

FIGS. 4A and 4B schematically illustrate cooperation between the elements of the kinematic mount on the sensor head and the sensor head carrier. The sensor head carrier is illustrated in FIG. 4A from above. The sensor head carrier comprises the inner ring 52, and around the circumference of the aperture through which the sensor head can be extended, a plurality of slots 57 is present on the inner ring 52. The slots are arranged in a symmetric manner and such that the sensor head can be placed onto the slots having a plurality of different rotational orientations. For example, the sensor head 53 illustrated in FIG. 4B with the ball feet 55 can be placed onto the sensor head carrier in the orientation depicted in FIG. 4, but also in the upside down orientation. Moreover, from the arrangement of slots illustrated in FIG. 4A, it is clear that due to the symmetry of the arrangement of the slots 57 around the circumference of the aperture 54, the sensor head 39 can be placed onto the sensor head carrier in six different orientations. Therefore, also the scanning can be performed in these six directions (this is three complementary back and forth scan directions). The sensor head carrier 50 and the inner part 52 thereof are further illustrated in FIGS. 5A and 5B. FIG. 5B provides an enlargement of the cross section of this element already provided in FIG. 3. As follows from FIG. 5B, the slots from 57 receive the ball feet 55 of the mounting structure 53 of the sensor head 39. As follows from the top view of the inner part 52 of the sensor head carrier 50, as illustrated in FIG. 5A, a total of twelve different slots 57 allow positioning of the sensor head 39 in twelve different rotational orientations with respect to the sample. In combination with for example the hexapod type of XYZ actuator illustrated in FIG. 3, all these twelve directions (six complementary back and forth directions) can be scanned by the SPM system 30.

Figure 6:
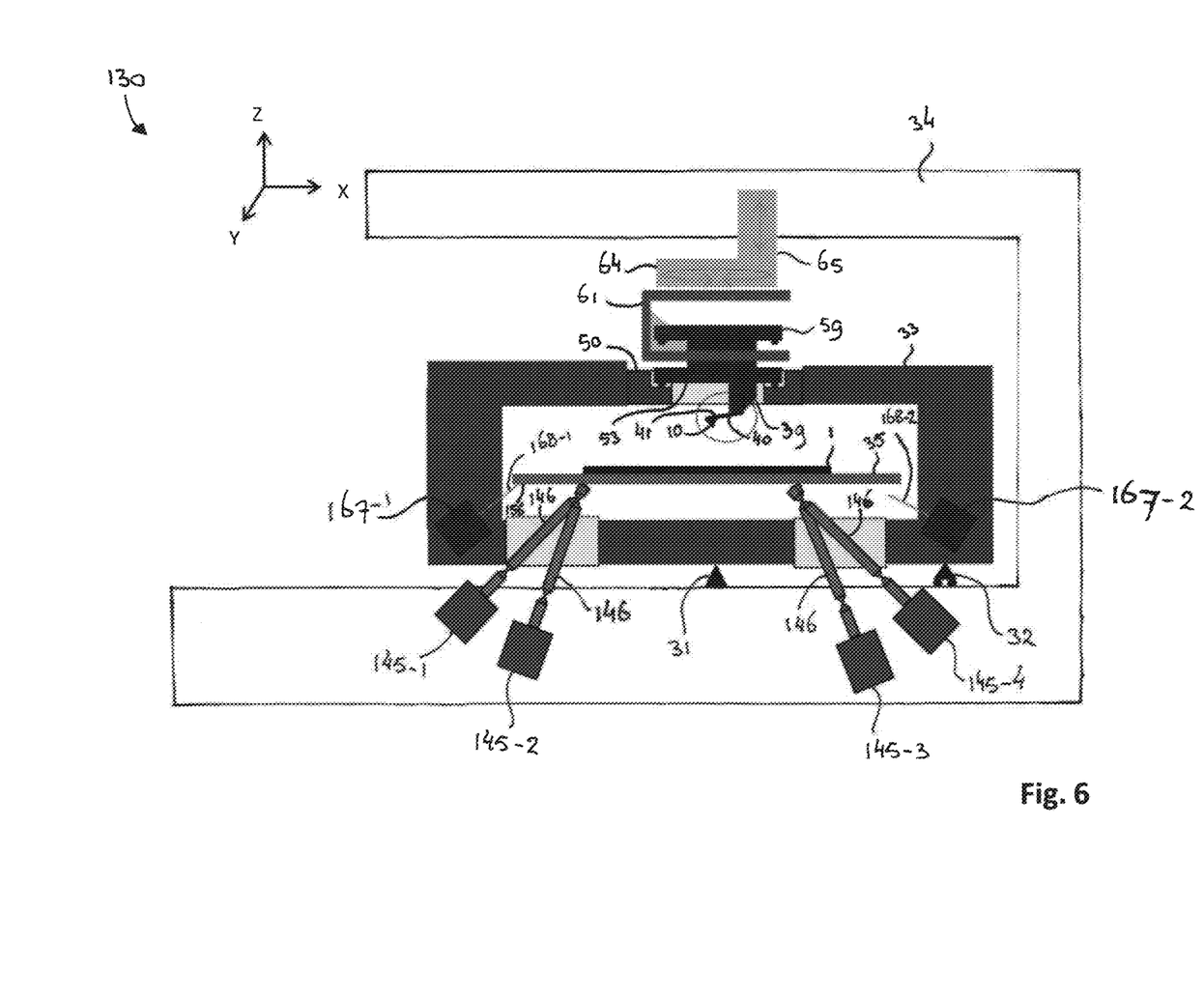
FIG. 6 provides schematic illustrations of a further embodiment, wherein the a hexapod type XYZ positioner holds a sample carrier.

FIG. 6 schematically illustrates a scanning probe microscopy system 130 in accordance with the present invention. The system comprises of force frame 34 that supports a metrology frame 33. The metrology frame 33 is placed on the force frame 34 using dampers 31 and 32. The metrology frame 33 comprises a substrate carrier 35 for supporting a substrate 1 to be scanned with the scanning probe microscopy system. The substrate carrier for example comprises a sample suction clamp that clamps a sample underneath the measurement area. The illustrated design of the substrate carrier is merely an example, and other designs of a substrate table may be applied, for example a table that supports the sample by means of burls or a clamping arrangement that clamps the sample in a different manner.

The sample 1 comprises a plurality of nanostructures that are to be mapped by the scanning probe microscopy system 130. To this end, the scanning probe microscopy system 130 comprises a sensor head 39 that includes a probe 40. The probe 40 comprises a cantilever 41 and a probe tip 10. The cantilever is placed under a fixed offset angle relative to the sensor head 39, such as to fix the offset angle of probe tip 10 relative to the substrate surface of substrate 1. During mapping of the nanostructures, the probe tip 10 will be scanned across the surface of the substrate. Here, the sample 1 will be lifted towards the probe tip 10. The probe 40 is brought in vibration, and the exact position and amplitude of the probe tip 10 is monitored using an interferometer. If the probe tip encounters a surface structure, the amplitude of the vibration will change, allowing the mapping of the surface structures.

The sensor head 39 extends from a mounting structure 53. The mounting structure 53 is placed on a cooperating structure of a sensor head carrier 50 of the system. The sensor head 39 further comprises an upper part 59 in addition to the mounting structure 53. The upper structure 59 allows lifting of the sensor head from the sensor head carrier. In the embodiment illustrated in FIG. 6, a lifting arrangement consisting of a lifting actuator 65, a rotational actuator 64 and a gripper 61 allow lifting of the sensor head. In case the gripper 61 is lifted using the actuator 65, the feet on the upper part 59 of the sensor head will engage on the gripper 61, thereby lifting the sensor head from the sensor head carrier. In another embodiment, the upper part 59 and the mounting structure 53 may be movable relative to each other such as to move the upper part towards the lower mounting structure 53. By moving the upper part 59 to the lower mounting structure 53 at some point the feet of the upper part engage on the gripper 61, thereby automatically releasing the ball feet from the slots of the kinematic mount.

The sample carrier 35 is mounted on the force frame 34 by means of a plurality of actuators 145-1, 145-2, 145-3 and 145-4 that form a hexapod type of positioning actuator (Steward platform). The legs 146 can each be increased or decreased in length, and can be rotated using actuators 145-1, 145-2, 145-3 and 145-4. These movements are performed in a coordinated manner such as to very accurately position the sample carrier 35 relative to the metro frame 33. The exact location or position of the sample carrier 35 relative to the metro frame 33 can be monitored using interferometers 167-1 and 167-2. The hexapod design structure may be used to perform movements in all kinds of directions of the sample carrier 35 relative to the metro frame 33. Moreover, the hexapod design can be used to perform the scanning motion of the sensor head relative to the substrate surface during mapping of the nanostructures. Interferometer 167-1 thereby projects a laser beam 168-1 onto a side 156 of the sample carrier. Interferometer 167-2 likewise projects a laser beam 168-2 onto the side 156 of the sample carrier.

It is noted that the sensing high aspect ratio features is not the only problem solved by the invention. Hence, the field of application of the invention is not limited to sensing high aspect ratio features. In principle, the invention allows to resolve any errors stemming from tip asymmetry of the probe tip. This is for example also relevant for determining the position of two features with respect to each other.

The invention has been described including a scan head comprising a probe having a fixed offset angle or probe tilting angle. In this respect, it is to be noted that this tilting is fixed at least during each experiment, but a structure may be foreseen wherein the probe tip tilting angle or fixed offset angle may be manually adjustable, e.g. by means of a screw, in between experiments.

The present invention has been described in terms of some specific embodiments thereof. It will be appreciated that the embodiments shown in the drawings and described herein are intended for illustrated purposes only and are not by any manner or means intended to be restrictive on the invention. It is believed that the operation and construction of the present invention will be apparent from the foregoing description and drawings appended thereto. It will be clear to the skilled person that the invention is not limited to any embodiment herein described and that modifications are possible which should be considered within the scope of the appended claims. Also kinematic inversions are considered inherently disclosed and to be within the scope of the invention. In the claims, any reference signs shall not be construed as limiting the claim. The term 'comprising' and 'including' when used in this description or the appended claims should not be construed in an exclusive or exhaustive sense but rather in an inclusive sense. Thus the expression 'comprising' as used herein does not exclude the presence of other elements or steps in addition to those listed in any claim. Furthermore, the words 'a' and 'an' shall not be construed as limited to 'only one', but instead are used to mean 'at least one', and do not exclude a plurality. Features that are not specifically or explicitly described or claimed may be additionally included in the structure of the invention within its scope. Expressions such as: "means for . . . " should be read as: "component configured for . . . " or "member constructed to . . . " and should be construed to include equivalents for the structures disclosed. The use of expressions like: "critical", "preferred", "especially preferred" etc. is not intended to limit the invention. Additions, deletions, and modifications within the purview of the skilled person may generally be made without departing from the spirit and scope of the invention, as is determined by the claims. The invention may be practiced otherwise then as specifically described herein, and is only limited by the appended claims.

The invention claimed is:

1. A scanning probe microscopy system for mapping nanostructures on a surface of a sample, said nanostructures including nanostructures comprising at least one face having a slope with a slope angle relative to a normal to the surface of the sample, wherein the slope angle is smaller than a threshold angle, the system comprising a metrology frame, a sample support structure for supporting a sample, a sensor head including a probe, wherein the probe comprises a cantilever and a probe tip, and wherein the scanning probe microscopy system further comprises an actuator for scanning the probe tip relative to the substrate surface for mapping of the nanostructures, wherein, for sensing the nanostructures, the probe tip is arranged under a fixed offset angle with respect to the sensor head such as to be angled relative to the sample surface, and wherein the system further comprises a sensor head carrier for receiving the sensor head, the sensor head carrier and the sensor head being provided with a mutually cooperating mounting structure having at least three contact points for detachable mounting of the sensor head on the sensor head carrier, wherein the sensor head carrier comprises an aperture through which the sensor head can be extended, and wherein around a circumference of the aperture the contact points are arranged in a symmetric manner for enabling the sensor head to be placed onto the sensor head carrier having a plurality of different rotational orientations.

2. The scanning probe microscopy system according to claim 1, wherein the mutually cooperating mounting structure forms a kinematic mounting structure.

3. The scanning probe microscopy system according to claim 1, wherein the mutually cooperating mounting structure on the sensor head and the sensor head carrier comprises at least three slots and at least three structural elements cooperating with the slots, wherein each of the slots arranged on either one of the sensor head or the sensor head carrier cooperates with at least one of the structural elements arranged on another one of the sensor head carrier and the sensor head.

4. The scanning probe microscopy system according to claim 3, wherein a number of slots of the mounting structure is larger than a number of structural elements, for allowing the sensor head to be mounted on the sensor head carrier in a plurality of selectable orientations with respect thereto.

5. The scanning probe microscopy system according to claim 4, further comprising a positioning actuator arranged for cooperating with the sensor head, wherein the positioning actuator is arranged for lifting the sensor head from the sensor head carrier, and for rotating the sensor head relative to the sensor head carrier such as to align the sensor head with at least one of said selectable orientations.

6. The scanning probe microscopy system according to claim 1, wherein the mutually cooperating mounting structure comprises cooperating coupling members arranged for allowing the sensor head to be mounted on the sensor head carrier in an arbitrary orientation with respect thereto, such as including cooperating circular shaped coupling members.

7. The scanning probe microscopy system according to claim 1, wherein the system further comprises one or more position sensors for monitoring a position, relative to the metrology frame, of at least one of: the sensor head carrier, the sensor head, the probe, the sample carrier, the sample or the surface of the sample.

8. The scanning probe microscopy system according to claim 7, wherein one or more of the position sensors are mounted on the metrology frame.

9. The scanning probe microscopy system according to claim 1, further including a force frame separate from the metrology frame such as to be mechanically decoupled therefrom, the system further including an XYZ-positioner actuator mounted on the force frame, wherein the XYZ-positioner actuator supports either one of:
the sensor head carrier; or
a sample carrier for supporting the sample;
said either one of the sensor head carrier or sample carrier being mounted on the XYZ-positioner actuator for enabling relative movement between the sensor head carrier and the sample carrier.

10. The scanning probe microscopy system according to claim 9, wherein the XYZ-positioning actuator comprises a Steward platform, the Steward platform comprising at least six slider legs including prismatic joints such as to form a hexapod positioner for positioning said either one of the sensor head carrier or the sample carrier.

11. The scanning probe microscopy system according to claim 9, wherein the system further comprises one or more position sensors for monitoring a position, relative to the metrology frame, of the XYZ-positioner actuator.

12. The scanning probe microscopy system according to claim 11, wherein one or more of the position sensors are mounted on the metrology frame.

13. The scanning probe microscopy system according to claim 1, the system including one or more further sensor heads, each further sensor head comprising a probe including a cantilever and a probe tip,
wherein for each further sensor head the cantilever of the probe extends from a mounting face of the sensor head under a fixed offset angle therewith such as to be angled relative to the sample surface, the fixed offset angle being unique to said respective further sensor head.

14. The scanning probe microscopy system according to claim 1, wherein the probe tip comprises a cone angle defined by an internal angle between opposing sides of the probe tip, and wherein the threshold angle is equal to half of the cone angle.

15. The scanning probe microscopy system according to claim 14, wherein the fixed offset angle of the probe tip is at least half of the cone angle minus an expected maximum slope angle of the nanostructures relative to a normal to the surface of the substrate; or wherein said nanostructures comprise sidewalls perpendicular to the surface, and wherein the fixed offset angle is half of the cone angle.

16. The scanning probe microscopy system according to claim 1, wherein the mutually cooperating mounting structure further comprises one or more magnets for allowing static detachable fixing of the sensor head to the sensor head carrier, said magnets including at least one of: one or more electromagnets, or one or more permanent magnets.

* * * * *